June 18, 1935.  J. H. EYNON  2,005,028
MEANS FOR LUBRICATING CONNECTIONS BETWEEN
CONNECTING ROD, PISTON AND CRANKSHAFT
Filed April 27, 1934
Fig. 1.
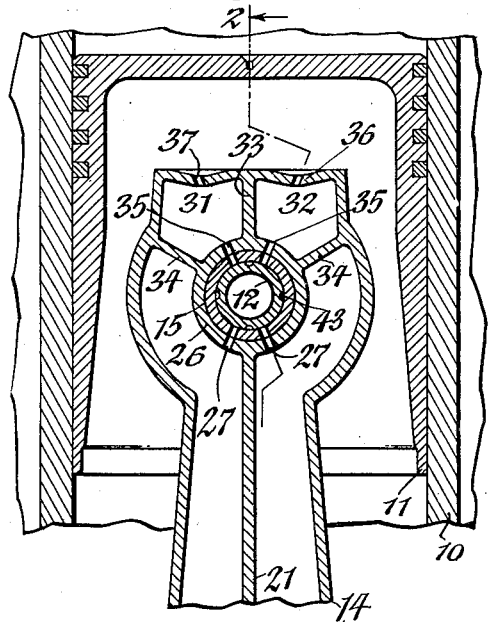
Fig. 2.
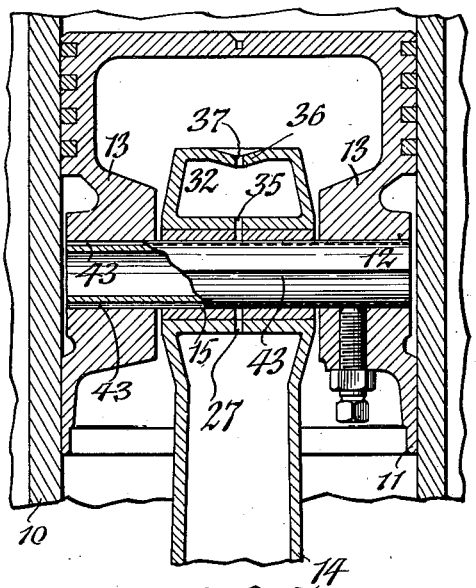
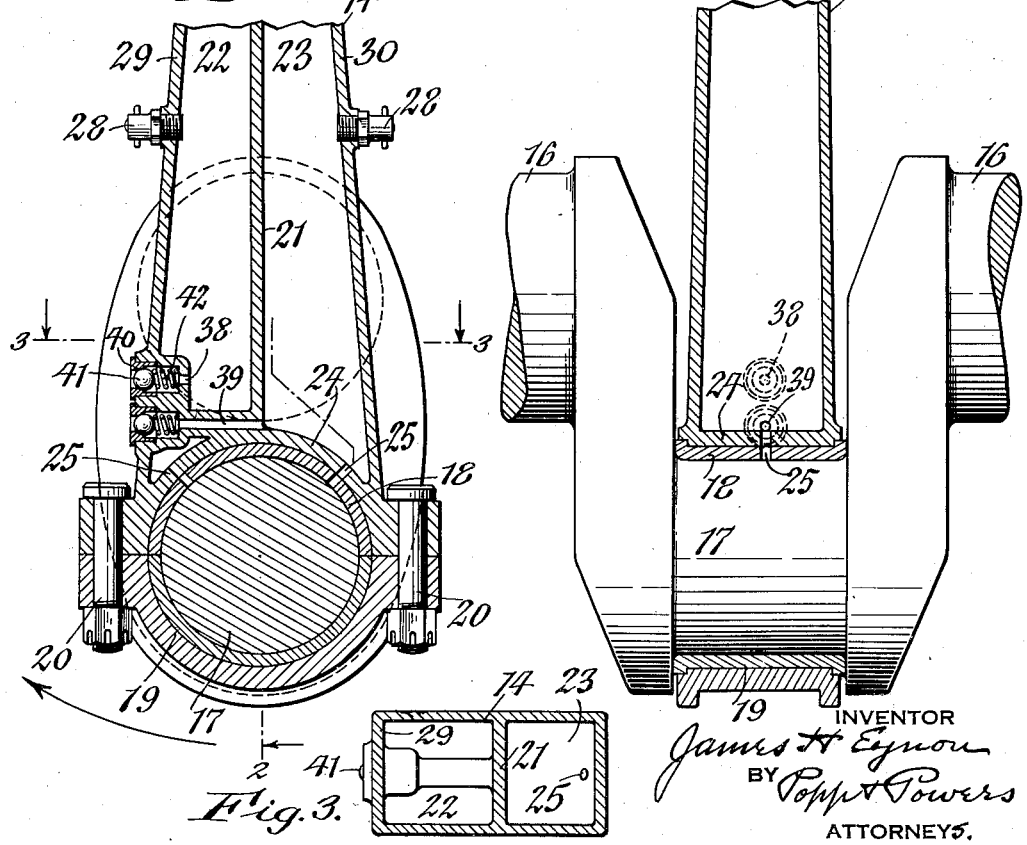
Fig. 3.
INVENTOR
James H. Eynon
BY Popp & Powers
ATTORNEYS.

Patented June 18, 1935

2,005,028

UNITED STATES PATENT OFFICE 2,005,028

MEANS FOR LUBRICATING CONNECTIONS BETWEEN CONNECTING ROD, PISTON, AND CRANKSHAFT

James H. Eynon, Bath, N. Y.

Application April 27, 1934, Serial No. 722,652

2 Claims. (Cl. 74—587)

This invention relates to an improvement in the means for lubricating the joints or bearings at opposite ends of a connecting rod in which bearings are journaled the pivot pin of a piston and the crank of a crank shaft. Such an organization is particularly useful in upright gas engines for driving automobiles but the same is also useful in other installations where similar conditions exist.

One of the objects of this invention is to provide lubricating means for these joints or bearings which permit the use of either a grease or other hard lubricant, or a liquid or oil lubricant, or both of these kinds of lubricants could be used at the same time.

Another object of this invention is to so construct the connecting rod as to provide a plurality of storage chambers for lubricant, which chambers are divided from one another by a partition so that the main part of the connecting rod is hollow and therefore light and yet is strong and durable due to the bracing or strengthening effect which is provided by the partition adjacent to the lubricant storage chambers.

A further object of this invention is to provide means whereby liquid lubricant contained in the crank case of a gas engine is picked up by the lower part of the connecting rod as it dips in this lubricant and transfers the same into the lubricant storage space of the connecting rod for subsequent use in more efficiently lubricating the joint or bearing between the connecting rod and the crank of the shaft.

A still further object of this invention is to provide means whereby the splashing of the liquid lubricant in the crank case and in the connecting rod will operate to lubricate the joint or bearing in the upper end of the connecting rod and the pin of the piston, and also between the periphery of the piston and the cylinder in which the piston reciprocates.

In the accompanying drawing:

Figure 1 is a vertical transverse section of the connecting rod, crank shaft, piston, cylinder and associated parts of a gas engine equipped with my improved lubricating means.

Figure 2 is a vertical longitudinal section of the same, taken on line 2—2 Fig. 1.

Figure 3 is a horizontal section taken on the correspondingly numbered line in Fig. 1.

Similar characters of reference indicate like parts in the several figures of the drawing.

The gas engine of which parts are shown in the drawing as an example of one manner of utilizing my invention, comprises an upright working cylinder 10, a piston 11 of the trunk type reciprocating vertically in the cylinder, a horizontal pivot or piston pin 12 mounted diametrically on the piston and having its opposite ends supported in bosses 13 on the body or wall of the piston, an upright connecting rod 14 having its upper part projecting into the piston between the bosses 13 thereof and provided at its upper end with a cylindrical bearing 15 which receives the central part of the piston pin 12, a rotary shaft 16 arranged below the cylinder and provided with an offset crank or wrist 17, and a lower bearing which is arranged at the lower end of the connecting rod and receives the crank 17, said lower bearing comprising an upper fixed section 18 formed integrally with the connecting rod 14, and a lower removable section or strap 19 which is detachably connected at its opposite ends with the corresponding ends of the upper section 18 by means of bolts 20, as shown in Fig. 1, or by any other suitable means.

The lower or main part of the connecting rod located between the axes of the piston pin and crank is made hollow and divided by means of an upright partition 21 so as to form two lubricant storage chambers 22, 23 which are arranged side by side in a direction fore and aft or circumferentially of the bearing faces of the piston pin and crank. The bottom 24 of each of these storage chambers is provided with an outlet passage or port 25 leading from the respective chamber to the cooperating joint or journaled surfaces between the lower bearing of the connecting rod and the periphery of the crank or wrist 17 for the purpose of conducting lubricant from the lower ends of the storage chambers to these cooperating surfaces. The lower part 26 of the upper bearing of the connecting rod is provided with two upper outlet or discharge ports 27, each of which extends from the upper end of one of the lubricant storage chambers to the underside of the periphery of the piston pin 12 for the purpose of conducting lubricant to the journal or joint surfaces between the upper bearing of the connecting rod and the periphery of the piston pin.

Lubricant may be introduced into the storage chambers 22 and 23 manually by any suitable means, for example by means of a manually operable grease gun or liquid supply pump which may be connected with inlet nozzles 28 arranged on the front and rear walls 29 and 30 of the connecting rod. Each of these nozzles is provided with a passage for conducting lubricant to the respective storage chamber and the same contains a check valve for preventing outward movement of the lubricant therethrough in a manner well-known in this type of fitting.

On the upper part of the connecting rod and preferably above the axis of the piston pin two catch basins 31, 32 are formed side by side in the connecting rod in a direction circumferentially of the periphery of the piston pin. These two catch basins are separated from each other by an upright longitudinal partition 33 which also assists to stiffen this part of the connecting rod notwithstanding the hollow formation of the same which provides the catch basins, and each of these catch basins is separated from the upper end of the storage chamber on the corresponding side of the connecting rod by means of a partition 34 which also performs the additional function of stiffening and strengthening the connecting rod, notwithstanding that the main part of the latter is made hollow. The upper part of the bearing 15 of the connecting rod is provided with two ports 35, each of which extends from the lower end of the respective catch basin to the bore of the bearing in which the piston pin is journaled for the purpose of conducting lubricant to the journal surfaces between these parts.

In the top 36 of each catch basin an inlet or catch port 37 is provided whereby lubricant which is splashed upwardly by the rotation of the crank shaft and connecting rod from the crank case into the upper part of the piston and falling downwardly upon the upper end of the connecting rod, will be directed through said openings 37 into the catch basins, and thus provide lubricant for delivery against the upper side of the piston pin for more effectively lubricating the joint between the same and the upper end of the connecting rod.

The top 36 of each of these catch basins is preferably dished or sloped downwardly from its edge toward the inlet port 37 in the central part thereof so that any oil dropping upon this top will be directed toward said opening and thus insure a supply of lubricant to the respective catch basin.

When using liquid or oil in each of the storage chambers the same flows from the lower ends thereof through the ports 25 to the cooperating surface between the lower bearing of the connecting rod and the crank. At the same time the lubricant in these storage chambers is churned or dashed in the storage chambers by the movement of the connecting rod, so that some of this lubricant is discharged from the upper ends of these chambers through the ports 27 against the underside of the piston pin, while the upper side of the latter is being lubricated by oil which has been splashed from the crank case upwardly into the piston and caught by the catch basins preparatory to being delivered to the upper bearing of the connecting rod.

By this means a more perfect lubrication of the lower and upper bearings of the connecting rod is obtained than has been possible by the means heretofore in use, thereby reducing the wear on the journal surfaces as well as eliminating noisy operation.

If desired a free-flowing or oil lubricant may be used in both of the storage chambers, but it is preferable to employ oil in one of these chambers and a grease or relatively hard lubricant in the other storage chamber so that in operation the oil lubricant would be used first and if, through oversight, this oil lubricant becomes exhausted then the grease or hard lubricant which has been held in reserve will become gradually melted due to the heating of the crank and the lower rod bearing, which melted grease or hard lubricant would be gradually fed as required to the lower rod bearing and the crank, and maintain the same in a properly lubricated condition.

Similarly, oil or free-flowing lubricant can be used in both of the catch basins, but if desired, one of these basins may be filled with a hard or grease lubricant which will be held in reserve and only become melted by heating of the upper connecting rod bearing and the piston pin, and thus cause the grease or hard lubricant to gradually flow to the cooperating surfaces between the upper rod bearing and the piston pin for maintaining the same in a lubricated condition.

On its front side the connecting rod is provided with means whereby liquid lubricant may be picked up from the crank case of the engine while the connecting rod is dipping into the oil contained in the crank case, and then transferred into the storage chambers for the purpose of maintaining the same automatically filled with lubricant for subsequent use in the upper and lower bearings of the connecting rod.

For this purpose two feed ports 38, 39 are provided, one of which 38 extends from the lower part of the front side of the connecting rod to the lower end of the front storage chamber 22 and the other extending from the corresponding part of the connecting rod to the lower end of the rear storage chamber 23. At its front end each of these feed ports is provided with a check valve having an inwardly facing seat 40 and a ball valve 41 which is pressed outwardly by a spring 42 against the respective seat, thereby permitting an inflow through the respective port, but preventing an outflow therethrough.

The springs 42 of these check valves are sufficiently light that when the front side of the lower part of the connecting rod moves downwardly and forwardly through the oil bath in the crank case, the pressure of this oil against the check valves 41 will cause the latter to recede from their seats and permit some of the oil during each rotation of the crank shaft to pass through the respective feed ports 38, 39 into the storage chambers, so that a constant oil refilling action into these storage chambers is effected, while the engine is in operation, and thereby reduces to a minimum the liability of exhausting the lubricant supply and running dry the lower bearing of the connecting rod.

In the preferred installation of this invention the piston pin 12 is provided with a plurality of longitudinal grooves 43 whereby some of the oil which is deposited upon the central part of the periphery of the piston pin for lubricating the joint between the same and the upper bearing of the connecting rod is carried lengthwise in opposite directions to the periphery of the piston and thus operates to lubricate the cooperating surfaces between the latter and the bore of the cylinder in which the piston reciprocates.

By this means a more effective and certain lubrication of the bearing surfaces between the connecting rod and the crank and piston pin, and also between the piston and the cylinder is effected and the possibility of these parts running dry is avoided, whereby undue wear on the engine is eliminated and smooth and noiseless operation is insured.

I claim as my invention:—

1. A rod for connecting the pin of a piston with the crank of a shaft, having upper and lower bearings which receive said pin and crank, respectively, two lubricant storage chambers arranged side by side fore and aft of the rod or circumferentially of said pin and crank and between the axes thereof, ports leading from opposite ends of each of said storage chambers to each of said bearings, and two lubricant catch basins arranged side by side fore and aft of the rod or circumferentially of said upper bearing and above the axis thereof and each having a lubricant catch inlet in its top and a lubricant discharge outlet in its bottom leading to the upper bearing.

2. A rod for connecting the pin of a piston with the crank of a shaft, having upper and lower bearings which receive said pin and crank, respectively, two lubricant storage chambers arranged side by side for and aft of the rod or circumferentially of said pin and crank and between the axes thereof, ports leading from opposite ends of each of said storage chambers to each of said bearings, and two lubricant catch basins arranged side by side fore and aft of the rod or circumferentially of said upper bearing and above the axis thereof and each having a lubricant catch inlet in its top and a lubricant discharge outlet in its bottoom leading to the upper bearing, the top of each catch basin being dished downwardly toward the inlet therein.

JAMES H. EYNON.